INVENTOR

BY

ATTORNEY

United States Patent Office 3,538,698
Patented Nov. 10, 1970

3,538,698
BREAK-SPINNING APPARATUS
Josef Ripka, Frantisek Hortlik, Jan Junek, and Milan Marsalek, Usti nad Orlice, Czechoslovakia, assignors to Vyzkumny Ustav Bavlnarsky, Usti nad Orlice, Czechoslovakia
Filed Aug. 11, 1969, Ser. No. 848,792
Claims priority, application Czechoslovakia,
Aug. 10, 1968, Ser. No. 5,819/68
Int. Cl. D01h 1/12
U.S. Cl. 57—58.95                             18 Claims

ABSTRACT OF THE DISCLOSURE

A break-spinning apparatus comprises a rotary spinning chamber having an axis of rotation and an internal cavity provided with an open side and bounded at least in part by an inner circumferential slip surface which is concentric with the axis of rotation. Fiber supply means supplies fibers for deposition onto the slip surface. Wall means includes a wall portion which extends through the open side into the cavity and has an outer surface juxtaposed with the inner circumferential surface. Channel means is provided in the wall means and communicates with the supply means to receive fibers therefrom. An outlet of the channel means is provided in the outer surface of the wall means and penetrates the same eccentrically with reference to the axis of rotation and on a penetration curve a projection of which, taken in the direction towards the slip surface along the surface lines of the channel, defines on the slip surface a fiber impingement area whose limits in the direction of the axis of rotation correspond substantially to predetermined contour lines of the slip surface.

BACKGROUND OF THE INVENTION

The present invention relates generally to spinning apparatus, and more particularly to so-called break-spinning apparatus.

Break-spinning apparatus of the type to which the present invention is directed utilizes a rotary spinning chamber defining an internal cavity which is bounded by a circumferential slip surface and a collecting surface. Fibers are introduced into the interior of the chamber and impinge upon the slip surface along which they slip or slide until they reach the collecting surface whereon they are collected and converted into a yarn which is then withdrawn from the spinning chamber axially thereof.

Such apparatus further comprises separating means which separates the individual fibers of a fibrous web or sliver supplied to the separating means, so that they are conveyed from the separating means along a suitable channel into the interior of the rotary spinning chamber. A feature common to all of the apparatuses of this type is the fact that the fibers separated by the separating means must be conveyed through a suitable channel to the interior of the spinning chamber, and that they must be deposited on the slip surface of the spinning chamber without fouling the yarn which is simultaneously being formed also in the interior of the spinning chamber. Conveying of the fibers from the separating means to the interior of the rotary spinning chamber is usually effected by means of a stream of air or other suitable carrier medium.

In the devices known heretofore the solutions found for the arrangement of the channels through which the fibers move have not been entirely satisfactory. Thus, one known apparatus employs a supply tube of circular cross-section which changes its direction from an initial orientation coaxial with the axis of rotation of the spinning chamber to an orientation in which it extends approximately tangential to the collecting surface. The disadvantage of this construction is in the fact that the fibers are supplied directly onto the slip surface and thus cannot be entirely prevented from at least in part becoming instead deposited on the collecting surface and fouling the yarn which is under formation there, and further the small supply channel tube is of rather complex form and therefore difficult to produce.

A further apparatus known from the prior art employs a direct fiber-conveying channel of a rectangular or similar cross-sectional configuration which enters the interior of the spinning chamber in such a manner that its axis forms an acute angle with the plane of the end face of the spinning chamber bounding the open side of the latter. The channel is provided in wall means a cylindrical portion of which extends through this open side into the interior of the spinning chamber and has an outlet provided in this cylindrical portion. The disadvantage with this construction is that the fibers reach the slip wall approximately in radial direction which has unfavorable consequences for their deposition on the slip wall and subsequent shape and orientation for spinning purposes. This is true if the axis of the channel intersects the axis of rotation of the spinning chamber; if, on the other hand, the axis of the channel passes the axis of rotation of the spinning chamber in space without intersecting it, that is if the channel is arranged eccentric or laterally offset with respect to the axis of rotation of the spinning chamber, then the direction of the fiber supply is close to the tangential direction but because of the thus-obtained configuration of the outlet of the channel, the extent of scattering of the fibers on the slip wall increases in axial direction. This, in turn, provides the danger of direct scattering of the fibers onto the collecting surface with a resultant deterioration in both the quality and appearance of the yarn being produced on the collecting surface, not to mention the fact that this interferes with the stability of spanning. A further possibility is that of scattering of the fibers outwardly beyond the edge face bounding the open side of the rotary spinning chamber.

If such undesirable scattering of the fibers is to be avoided, then it is necessary to extend the slip wall excessively in axial direction of the rotary spinning chamber. This, on the one hand, increases the overhang of the rotating mass of the spinning chamber which is evidently detrimental to the service life of the mounting of the latter. On the other hand, when the dimension of the diameter of the slip wall is maintained, the size of the inlet opening at the open side of the spinning chamber necessarily decreases which in turn results in a reduction of the required eccentricity of the supply channel because the slope of the slip wall cannot be reduced beyond the so-called slippage limit if the fibers are still to be able to slip on the slip wall towards the greater-diameter regions of the spinning chamber.

A further prior-art construction provides a front cover closing the open side of the rotary spinning chamber, with a fiber supply channel being oblique and direct, and being arranged so as to discharge eccentrically with respect to the axis of rotation of the spinning chamber. The outlet opening of the channel is provided in this cover approximately in a plane at right angles to the axis of rotation of the chamber. In this construction the yarn being spun on the collecting surface is protected against fouling by incoming fibers via a flange of circular form, a so-called separator. The fibers issuing from the outlet of the supply channel thus cannot impinge upon the collecting surface. In face, they cannot impinge directly onto the slip wall but are instead projected by an air stream onto the separator from which they partly rebound and along which they slip in part. This prevents the fibers from scattering to the collecting surface on which the yarn forms. This construction, however, also has certain disadvantages. Rebounding of the fibers from the flange exerts a braking effect on the fibers and additionally results in criss-crossing of the individual fibers which produces a matting effect. Further, for the fibers which rebound there exists the possibility that they will fly off beyond the marginal edge of the open side of the chamber, and there is also an irregular distribution of the fiber density in the area of impingement of the fibers onto the slip wall. In fact, fibers may even experience multiple rebounding from the separators and other wall means, depending upon the angle of inclination of the supply channel with respect to the separator.

SUMMARY OF THE INVENTION

The present invention has for its general object to overcome these disadvantages.

More particularly it is an object of the present invention to provide an apparatus which is not possessed of these drawbacks.

An additional object of the present invention is to provide such an apparatus which is relatively simple in its construction and therefore economical in manufacturing.

In pursuance of the above objects, and others which will become apparent hereafter, one feature of the invention resides, briefly stated, in a break-spinning apparatus which comprises a rotary spinning chamber having an axis of rotation, the spinning chamber having an interal cavity provided with an open side and bounded at least in part by an inner circumferential slip surface concentric with the axis of rotation. Fiber supply means supplies fibers for deposition onto the slip surface and for subsequent conversion into a yarn. Wall means includes a wall portion extending through the open side into the cavity and having an outer surface juxtaposed with the inner circumferential surface. Channel means is provided in the wall means and communicates with the supply means to receive fibers therefrom. The channel means has an outlet provided in the outer surface of the wall portion and which outlet penetrates the outer surface eccentrically with reference to the axis of rotation of the spinning chamber and on a penetration curve a projection of which, taken in the direction towards the slip surface along the surface lines of the channel means, defines on the slip surface a fiber impingement area whose limits in direction of the axis of rotation correspond substantially to predetermined contour lines of the slip surface.

One embodiment of the present invention which is advantageous from the viewpoint of obtaining both a smooth transition of the fibers from the channel outlet onto the slip wall, and attainment of a smaller deviation of the boundaries of the impingement area from the contour lines of the slip surface, provides for the axis of the channel to form with the intersection of both the plane of the face of the chamber and a plane extending through both the longitudinal axis of the channel and the major axis of the channel cross-section, an angle ranging from substantially 20° to 89°. It is emphasized herein that the term "face of the chamber" refers to the edge face bounding the open side of the chamber.

A further embodiment of the invention, particularly advantageous from the viewpoint of a more gentle change of direction of the advancing fibers during their movement from the channel outlet onto the slip wall, provides for the axis of the channel to have the form of a portion of a circle which, at an acute angle, intersects the intersection of the plane of the face of the chamber and a plane extending through both the longitudinal axis of the channel and the major axis of the channel cross-section.

A further embodiment of the invention assures a gentle change of direction of the advancing fibers during their movement from the channel to the slip wall, while providing ease of driving a plurality of spinning chambers and associated carding rollers—which constitute the fiber separating means mentioned earlier—by means of a tangential belt drive, provides for the axis of rotation of the spinning chamber and the axis of rotation of the carding roller to pass clear of each other at right angles, that is to cross one another in space.

Another embodiment of the invention is particularly advantageous with a view to obtaining the smallest possible deviation of the boundaries of the impingement area from the contour lines of the slip surface, and also to obtain a smooth transition of the fibers from the channel onto the slip wall. According to this embodiment the tangent line to the axis of the channel, at the discharge point of the channel within the spinning chamber, intersects the slip surface of the spinning chamber substantially at a point coinciding with the main apex of an imaginary curve formed by a section of the slip surface through a plane extending through the longitudinal axis of the channel and through the major axis of the channel cross-section.

In accordance with another embodiment, which is advantageous with a view to obtaining a favorable discharge from a relatively short fiber supply channel, provides for the walls of the channel to be formed by helical surfaces having a common axis, the latter forming an acute angle with the plane of the face of the rotary spinning chamber.

A particularly simple construction provides for the helical surfaces which form the walls of this channel to be straight, meaning that the channel itself is straight but helically twisted about its axis.

Still a further embodiment is advantageous in providing a collective drive for all chambers and carding rollers of an apparatus utilizing the invention, via a tangential belt. It provides for the axis of the spinning chambers and the respectively associated carding rollers to be concurrently perpendicular, that is normal to each other.

Yet another embodiment of the invention, also advantageous because of its simplicity of construction, provides for the lateral surface of the wall portion which extends through the open side into the interior of the spinning chamber, and which wall portion is a part of a cover closing the open side, to be cylindrical.

If it is desired to make the cover in such a manner that it can be opened tiltably, then the lateral wall of the wall portion extending into the interior of the rotary spinning chamber may be made conical.

Ease of manufacture and simplicity of prevailing conditions, particularly pneumatic conditions, is provided in a further embodiment wherein the inlet of the channel—receiving fibers from the fiber supply means—communicates with the ambient atmosphere.

An embodiment which is advantageous for ease of supplying the fibers from a drawing mechanism into the channel, provides for the inlet of the channel to be located in the immediate proximity of the delivery rollers of a drawing mechanism.

To obtain a very smooth transition of the fibers from the outlet of the channel onto the slip wall of the chamber, an embodiment of the invention provides for the channel cross-section to diverge in the direction towards the channel outlet.

Another embodiment of the invention facilitates transport of the fibers through the channel under high acceleration, and also a smooth transition of the fibers from the channel outlet onto the slip wall. In this embodiment the channel cross-section first converges in the direction towards the channel outlet, and thereupon diverges in this same direction.

If it is desired to assure that the fibers within the entire cross-section of the channel have a small relative difference in the change of their direction of motion during their transition onto the slip wall, the channel is made to widen asymmetrically in a direction coincident with the direction of motion of the slip wall, counter to the discharge or outlet of the channel.

Finally, a further embodiment of the invention is particularly advantageous from the viewpoint of obtaining a free adjustment of the trajectory of the fibers within the channel, at the beginning of rotation of their leading end together with the slip wall, and this embodiment provides for the widening of the channel to be located immediately upstream of the channel outlet and to be rounded in nature.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Before proceeding with a discussion of the individual drawings it is emphasized that they are all of a rather diagrammatic nature and should be viewed with this in mind.

Figures 1, 2:
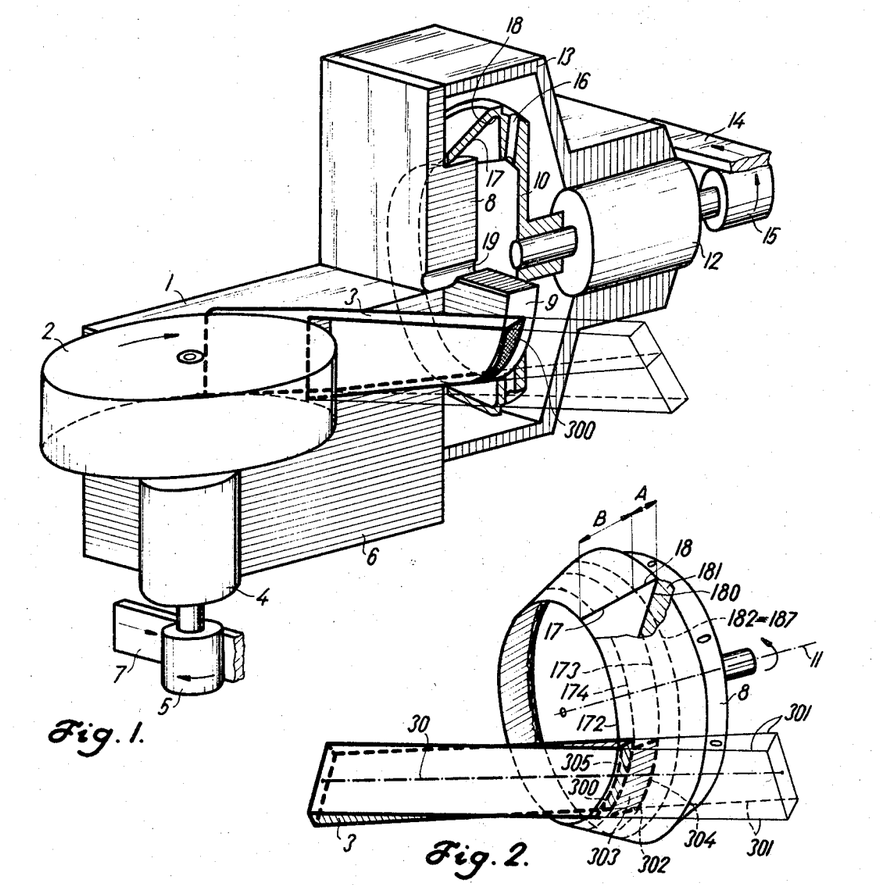
FIG. 1 is a diagrammatic illustration of a spinning unit according to the present invention in one embodiment and shown in vertical section.
FIG. 2 is a diagrammatic illustration showing the relative geometry between a channel, its discharge outlet and the projection of this outlet onto a slip wall of a spinning chamber.

Discussing now the drawing in detail, and firstly the embodiment illustrated in FIG. 1 thereof, it will be seen that there is provided a separating mechanism comprising a conventional carding roller 2 which is rotatably mounted in a bearing 4 and driven in rotation by a belt pulley 5 associated with a tangential belt 7. The manner in which the belt 7 is moved in the direction associated with its arrow, to thereby rotate the pulley 5 and the carding roller 2 in the direction of their respective arrows, is immaterial for purposes of the present invention, as is the particular construction of the carding roller 2 which in any case is well known.

A body 6, in which the remainder of the components of the separating mechanism 1 are housed, also constitutes in part a cover 8 of a rotary spinning chamber 10 of known construction. The body 6 is provided with a fiber transport channel 3 whose outlet discharges from a lateral wall 9 of a portion of the cover 8 located within the cavity of the rotary spinning chamber 10, in form of a penetration curve 300. A bearing 12 of the spinning chamber 10 is secured in a cover 13 surrounding the chamber 10, and the latter is driven in rotation by a belt 14 via a belt pulley 15.

Air-escape apertures 16 are provided in the spinning chamber 10 to permit the escape of air during rotation of the spinning chamber. The interior of the cavity of the spinning chamber is bounded by a conical slip wall 17 which merges into a collecting surface 18 located, in conventional manner, at the region of widest cross-section of the cavity. An opening 19 is provided in the cover 18 through which the yarn, which is not shown but which is formed of fibers which move from the slip wall 17 onto the collecting surface, may be withdrawn in conventional manner by suitable withdrawing devices.

FIG. 2 shows lines and surfaces to which reference is made throughout the present disclosure. The channel 3 intersects the lateral wall surface 9 (compare FIG. 1) in the penetration curve 300. By extending all of the surface lines of the channel 3—with the corner lines 301 having been shown for guidance purposes—a projection 302 of the penetration curve 300 is obtained on the slip wall 17; this projection 302 defines an impingement area 303 on the slip wall 17, and it is emphasized that the fibers issuing from the outlet of the channel 3 impinge upon the slip wall 17 within the outlines of the impingement area 303.

The collecting surface 18 is limited by a lower boundary 181—the terms lower and upper here refer to greater or lesser proximity to the open side of the cavity of the rotary spinning chamber—which in practice is determined by the maximum inner diameter of the spinning chamber, and by a boundary 182. The distance A, meaning the axial width of the collecting surface 18, of the two boundaries depends upon the width of a ribbon 180 of fibers which increases as the metric count of the spun yarn decreases. The upper boundary 182 at the same time constitutes a lower boundary 171 of the slip wall 17, the width B of which is determined by the spacing of an edge 172 from the lower boundary 171.

As shown, a lower limit 304 of the area 303 passes approximately along a contour line 173 and an upper limit 305 of the area 303 passes approximately along a contour line 174 of the slip wall 17. Thus, the contour lines 173 and 174 define between themselves a slip surface onto which the fibers are to be deposited upon issuing from the outlet of the channel 3. The latter is an eccentric channel because, as shown in FIG. 2, the axis 30 of the channel 3 and the axis of rotation 11 of the spinning chamber 10 pass clear of each other, that is, they pass one another in space.

An apparatus according to FIGS. 1 and 2 receives fibers in form of a sliver in known manner, and these fibers are—again in known manner—separated by the carding roller 2. The thus-separated fibers are then transported through the channel 3 and issue from the outlet thereof to impinge substantially in the area 303 on the slip wall 17, from where they move onto the collecting surface 18 by slipping over the slip wall 17; on the collecting surface 18 they form the fibrous ribbon 180 which is twisted into yarn to be thereupon withdrawn in known manner through the opening 19.

It will be appreciated that the impingement area 303 shown in FIG. 2 is a theoretical area of impingement defined by the projection 302 which is obtained by extending all surface lines of the channel 3 onto the slip wall 17. In the event that the walls of the channel are not planar, the impingement area 303 is defined by a projection 302 of the penetration curve 30 by tangentially extending the surface lines of the channel from the outlet thereof onto the slip wall 17.

Figure 3A:
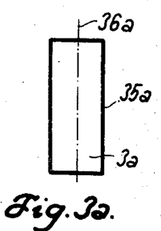
FIG. 3a shows one cross-sectional configuration of a fiber supply channel.

FIG. 3a shows one possible cross-sectional configuration for the channel, which is here identified with reference numeral 3a. The cross-sectional configuration 35a in FIG. 3a is substantially rectangular and the major axis of the cross-section is identified with reference numeral 36a.

Figure 3B:
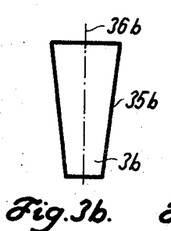
FIG. 3b shows a further cross-sectional configuration of a fiber supply channel.

FIG. 3b shows a channel 3b the cross-section 35b of which is trapezoidal, with the major axis being identified with reference numeral 36b.

Figures 3C, 3D:
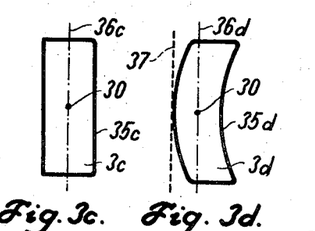
FIG. 3c shows still aiother cross-sectional configuration of a fiber supply channel.
FIG. 3d shows yet a further cross-sectional configuration of a fiber supply channel.

The cross-section 35c of the channel 3c shown in FIG. 3c is analogous to that of FIG. 3a in that it is substantially rectangular; however, in FIG. 3c, the cross-section is rounded at two corners of the rectangle, as shown at the right-hand side of FIG. 3c. The longitudinal axis of the channel 3c is identified with reference numeral 30, and the major axis of the cross-section with reference numeral 36c.

FIG. 3d, finally, shows a cross-section 35d of a channel 3d, with the cross-section 35d being curved as shown and with the major axis 36d of the cross-section being parallel to a tangent line 37 to the surface 38 and extending at right angles to the longitudinal axis 30 of the channel 3d.

Figures 4, 9, 10:
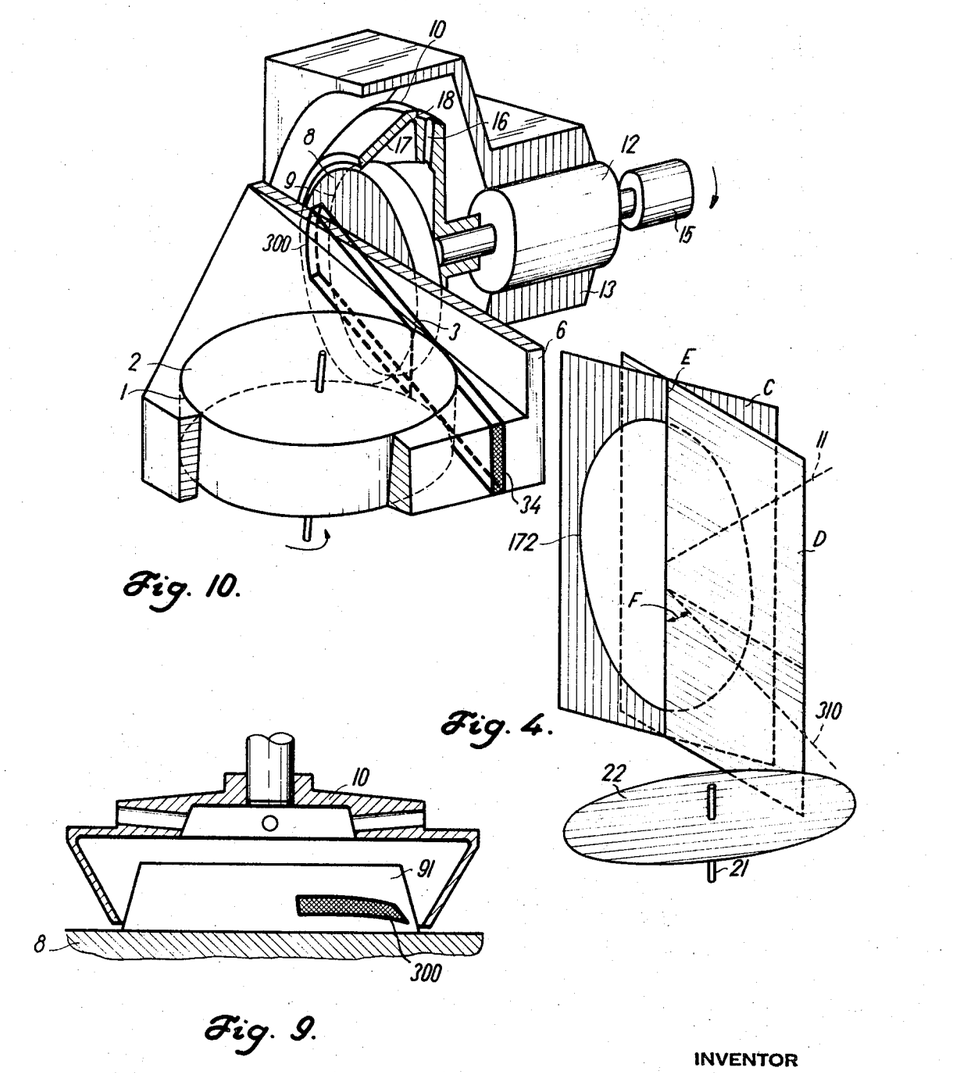
FIG. 4 shows the geometry of an embodiment wherein the axis of a straight channel forms with an intersection of a plane of a face of the rotary spinning chamber and a plane extending through both a longitudinal axis of the channel and the major axis of the channel cross-section, an angle ranging between 20° and 89°.
FIG. 9 is a diagrammatic section through a spinning chamber showing a portion of a cover closing the open side of the spinning chamber to taper conically into the latter.
FIG. 10 illustrates an embodiment wherein the fiber inlet of a fiber supply channel communicates with the ambient atmosphere.

The embodiment of FIG. 4 shows a plane C of the face of the rotary chamber which is intersected by a plane D coincident with the longitudinal axis 310 of a straight channel (not shown but see FIG. 3a) and passing through the major axis of the cross-section of this channel. The designation "straight channel" is intended to mean a channel the walls of which are substantially planar. The carding roller is here represented by a disk 22. An intersection E of the planes C and D forms with the axis 310 an angle F. In the plane C the edge 172 is indicated of the spinning chamber 10 which is not shown in FIG. 4, but for which reference may be had to FIG. 2. An axis 21 of the carding roller and the axis 11 of the spinning chamber may pass clear of each other at right angles, that is may cross one another in space, as illustrated in FIG. 4 by means of the axis of the disk 22 which represents the carding roller. The embodiment of FIG. 4a is substantially the same as that of FIG. 4 except that here the carding roller is represented by the disk 23 and the axis 21a of the disk 23 as well as the axis 11 of the spinning chamber also cross one another in space but not at right angles.

To determine the plane D in FIGS. 4a, 5, 6 and 7—of which the latter three figures are still to be discussed—in which plane D there lies the longitudinal axis of the respective channel, the major axis 36 of the channel cross-section 35 is introduced, the axis 36 being normal to the longitudinal axis as shown in FIGS. 3a, 3b, 3c and 3d. It will be appreciated that in FIGS. 3a, 3b and 3c the major axis 36a, 36b and 36c, respectively, substantially constitutes the axis of symmetry of the channel cross-section 35. If, as shown in FIG. 3d, the cross-section is curved, then the major axis 36d of the cross-section is intended to mean a straight line which is normal to the longitudinal axis 30 of the channel 3d and parallel to the tangent line 37. The cross-sectional configuration shown in FIG. 3 is particularly advantageous from the viewpoint of obtaining minimum deviations of the upper and lower limits of the impingement area 303 from the contour lines of the slip wall 17.

In the event that an eccentric channel is employed there are several ways to assure that the lower and upper limits of the impingement area will extend approximately along the contour lines of the slip surface. Two possibilities are shown in FIGS. 4 and 4a, discussed before, wherein the longitudinal axis 310 of the straight channel intersects the intersection E of the planes C and D at an acute angle F which equals between 20 and 89 degrees. The magnitude of the angle F depends on the eccentricity of the channel with respect to the axis of rotation of the spinning chamber. The greater the eccentricity, the smaller will be the angle F. If, as shown in FIG. 4, the axis 21 of the carding roller passes clear of the axis 11 of the spinning chamber at right angles, it is advantageous for creating the possibility of a group belt drive for all spinning chambers and carding rollers of a given machine, or of course the axes 21 and 11 may be generally skew with one another as shown in FIG. 4a. The plane D is preferably parallel to the axis 21 of the carding roller.

Figures 4A, 5, 6:
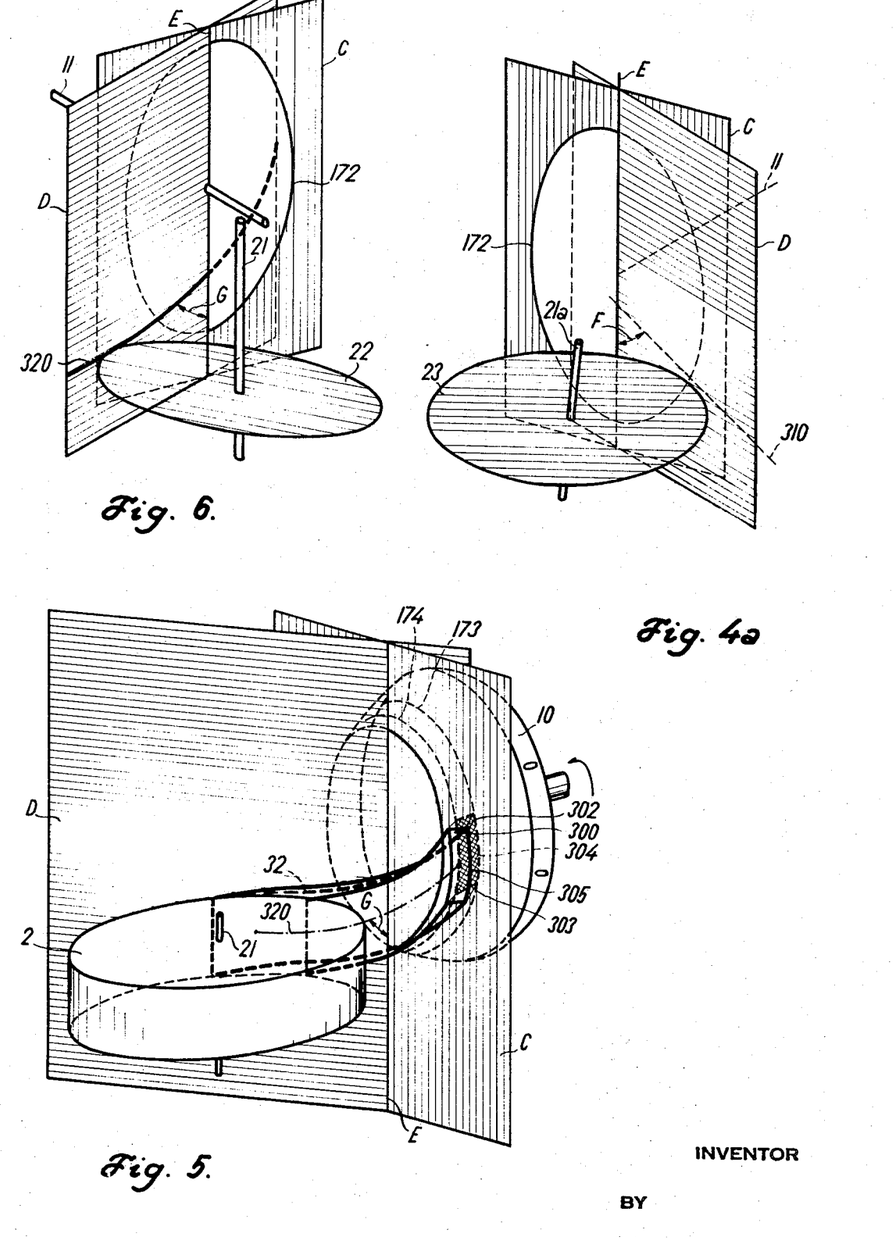
FIG. 4a is similar to FIG. 4 but illustratnig a modification of the embodiment of FIG. 4.
FIG. 5 shows the relative geometry between a channel, the axis of which has the form of a portion of a circle, its outlet aperture and the projection thereof onto the slip wall of a rotary spinning chamber.
FIG. 6 shows the geometry of an embodiment wherein the axis of the channel has the form of a portion of a circle intersection at an acute angle the intersection of the plane of the face of a spinning chamber and a plane passing through the longitudinal axis of the channel and the major axis of the channel cross-section, with the axis of rotation of the spinning chamber and the axis of rotation of an associated carding roller passing each other in space at right angles.

A further possibility is based upon the employment of a curved channel 32, as shown in FIGS. 5 and 6. In this case, the axis 320 of the channel is curved in form of a portion of a circle and the fibers separated by the carding roller 2 are conveyed through the channel 32 onto the impingement area 303 onto the slip wall 17 of the spinning chamber 10. The axis 320 of the channel 32 forms with the intersection of the planes C and D an acute angle G, and the channel 32 of course intersects the lateral wall surface 9 (FIG. 2) in the penetration curve 300. It is evident that by a tangential extension of all surface lines of the channel 32 at the outlet of the channel in the wall surface 9, the projection 302 of the penetration curve 300 is obtained on the slip wall 17. The lower limit 304 of the impingement area 303 defined by the projection 302, passes approximately along the contour line 173 whereas the upper limit 305 passes approximately along the contour line 174 of the slip wall 17. The plane D is determined by the axis 320 of the channel 32 and the major axis of the channel cross-section.

In the embodiment of FIG. 3 the axis 2 of the curved channel lies in the plane D, and the axis 320 is curved in form of a portion of a circle. The plane C of the face of the chamber intersects the plane D in an intersection line E which forms with the axis 320 an acute angle G. The edge face 172 of the chamber—the latter not shown—is indicated with reference numeral 172. The carding roller is here represented by the disk 22 and it will be seen that the axis 11 of the nonillustrated spinning chamber and the axis 21 of the carding roller, represented by the disk 22, pass clear of each other at right angles.

Figure 7:
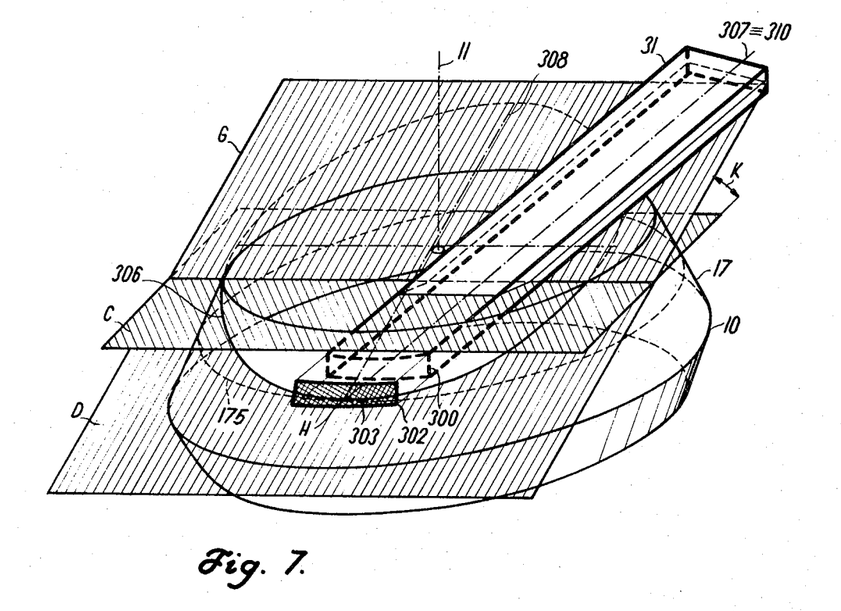
FIG. 7 shows the geometry of an embodiment wherein a tangent line to the axis of the channel, at the outlet of the channel, intersects a slip surface substantially at a point corresponding to the main apex of an imaginary curve formed by a section of the slip surface through a plane extending through the longitudinal axis of the channel as well as through the major axis of the channel cross-section.

In FIG. 7 the plane D passing through the longitudinal axis 310 of the straight channel 31, intersects the slip surface 17 with the axis of rotation 11 of the spinning chamber in a penetration curve 306. A tangent line 307 to the axis 310 of the channel at the outlet of the latter in the cover of the spinning chamber, intersects the slip surface 17 substantially in a main apex H of a curve 306 through which passes an axis of symmetry of the curve 306. Through the point H is led a contour line 175 of the slip surface 117. The straight channel 31 intersects the lateral wall surface 9 (not shown) of the cover 8 of the spinning chamber 10 in the penetration curve 300. The projection 302 of the channel in the direction of the tangent line 307 defines the area 303 on the slip wall 17. The plane D forms with the plane G of the face of the chamber an acute angle K. Since the slip wall constitutes a rotary surface, the curve 306 is symmetrical relative to the axis 308 which is the axis of symmetry of the curve 306. The main apex H of the curve 306 is intended to mean an intersection of the axis of symmetry 308 with the curve 306. If the slip wall is of a conical taper, as in FIG. 7, then the curve 306 is an ellipse and the point H is the main apex of the ellipse. The axis 310 of the channel 31 is straight and intersects the slip wall 17 substantially at a point coinciding with the main apex H of the curve 306.

Figure 8:
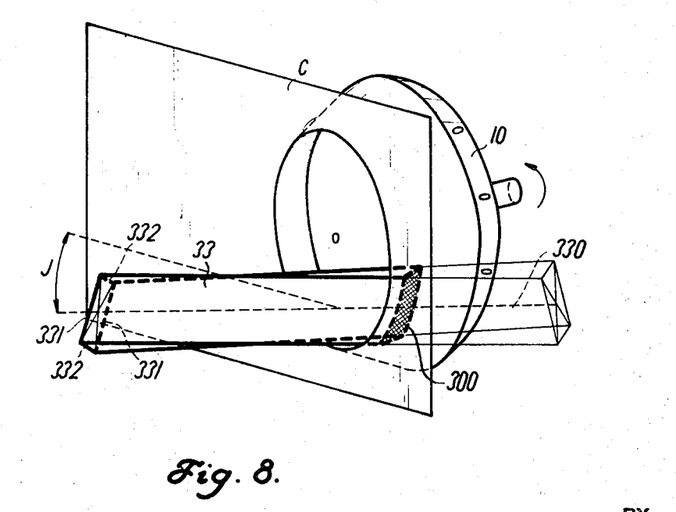
FIG. 8 shows the geometry of an embodiment wherein the walls of a channel are formed by helical surfaces having a common axis which forms with the plane of a face of the spinning chamber an acute angle.

A further embodiment is shown in FIG. 8 utilizing a helically twisted channel 33, the walls 331, 332, of which are formed by helically twisted surfaces. The channel 33 again intersects the lateral wall surface 9 (not shown) in the penetration curve 300. The plane C of the face of the spinning chamber forms with the axis 330 of the channel 33 an acute angle J. With this embodiment the change in the trajectory of the fibers in the helical channel is very small.

In the embodiment of FIG. 9 the spinning chamber 10 is again provided with the cover 8, a lateral wall surface 91 of which is of conical configuration. The penetration curve 300 of the nonillustrated channel in the wall 91 is illustrated in FIG. 9.

FIG. 10 shows an embodiment wherein the inlet 34 of the channel communicates with the ambient atmosphere. The device shown in FIG. 10 comprises the separating mechanism 1 with the carding roller 2, the spinning chamber 10 rotatably mounted in the bearing 12, and the belt pulley 15. The bearing 12 of the spinning chamber 10 is secured in the cover 13 and the spinning chamber is provided as before with the slip wall 17 which merges into the collecting surface 18 and is provided with the air-escape apertures 16. The channel 31 is straight and provided in the body 6 of the separating mechanism 1. It has an inlet 34 which communicates with the ambient atmosphere and an outlet provided in the lateral wall surface of the cover 8, as defined before.

Figure 11:
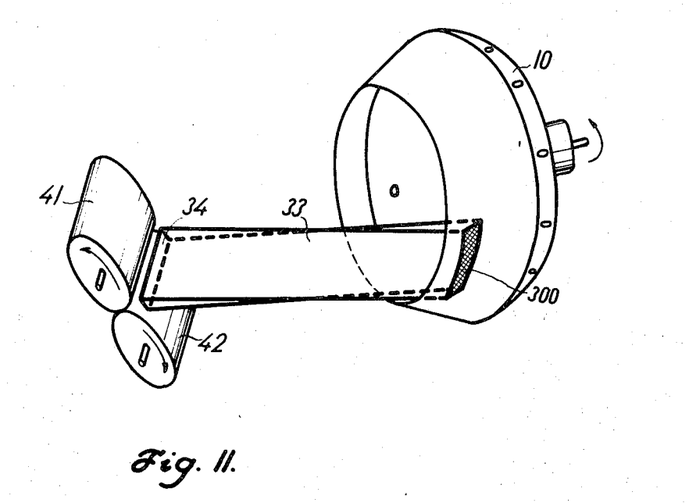
FIG. 11 is a diagrammatic illustration of an arrangement of a fiber supply channel with respect to the delivery rollers of a drawing mechanism.

FIG. 1 shows an arrangement wherein a delivery roller pair 41, 42 of a drawing mechanism (not shown but well known to those skilled in the art) is illustrated, with the inlet 34 of a helical channel 33 being arranged in the immediate proximity of the rollers 41, 42. The fibers issuing from the drawing mechanism are aspirated into the inlet 34 and conveyed into the spinning chamber.

Figure 12:
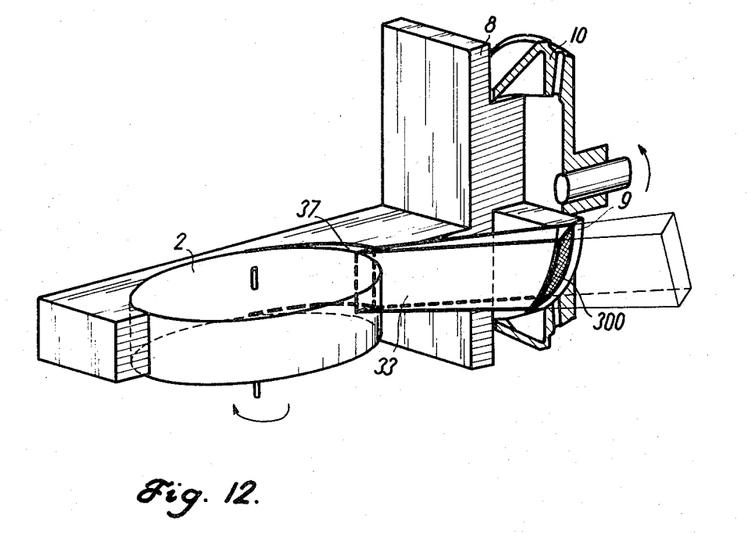
FIG. 12 is a diagrammatic illustration, partly in section, of an embodiment wherein the fiber supply channel diverges in cross-section towards the outlet thereof.
Figure 13:
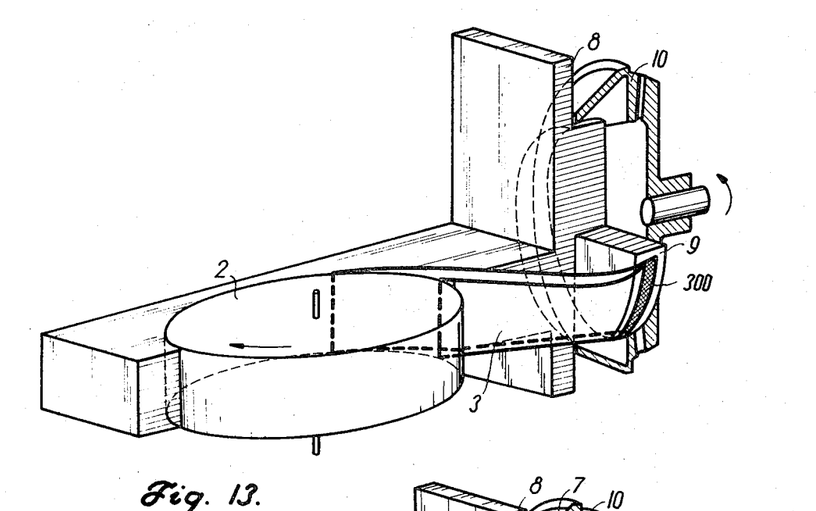
FIG. 13 is a view substantially similar to FIG. 12 but showing the channel cross-section to first converge and thereupon diverge in direction towards the channel outlet.
Figure 14:
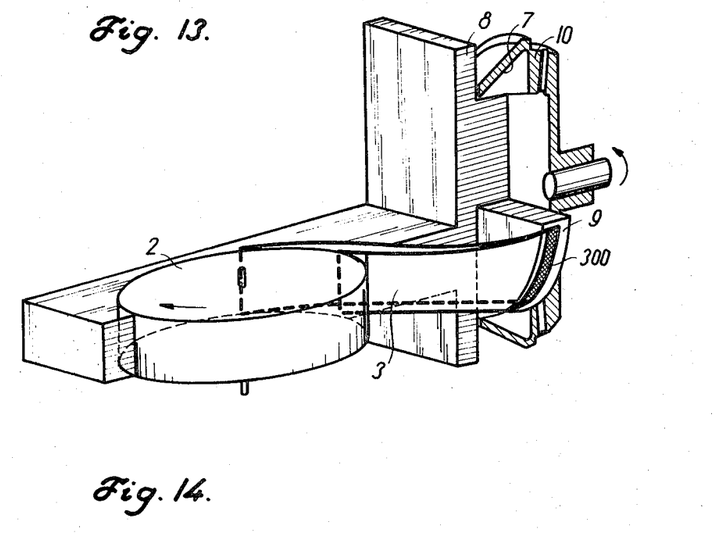
FIG. 14 is a view substantially similar to FIG. 13 but showing the channel cross-section to diverge asymmetrically in direction towards the channel outlet, and further in direction coincident with the direction of rotation of the slip wall, counter to discharge of the channel.

If it is desired to provide for a more gentle change in the direction of motion of the fibers during their movement from the outlet of the channel onto the slip wall of the rotary spinning chamber, the embodiments of FIGS. 12, 13 and 14 may be employed wherein the channel 3 or channel 33 is of divergent cross-section. In FIG. 12 the cavity 37 of the carding roller 2 communicates with the helical channel 33 whose cross-section diverges in the direction towards the outlet provided in the lateral wall surface 9 of the cover 8 closing the open side of the spinning chamber 10. The penetration curve 300 is illustrated as before.

In FIG. 13 the carding roller 2 again discharges into the channel 3 whose cross-section, however, first converges and thereupon diverges in the direction towards its outlet provided in the lateral wall surface 9 of the cover 8 closing the spinning chamber 10.

In FIG. 14 the channel 3 widens asymmetrically in a sense coincident with the direction of rotation of the slip wall 17, at the outlet of the channel 3 in the lateral wall surface 9. With the embodiments in FIGS. 13 and 14 the direction of motion of the fibers, at the moment of impingement of the fibers onto the slip wall 17, is close to the direction of the tangent line to the slip wall whereby the friction of the fibers on the lateral wall of the channel is reduced to a minimum and breaking and mutaul crossing of the fibers are avoided. The embodiment of FIG. 3 is particularly well suited if for the transporation of the fibers it is advisable to accelerate their velocity, because of the convergent-divergent cross-section of the channel 3.

It will be understood that each of the elements described above, or two or more together, may also find a useful application in other types of constructions differing from the types described above.

While the invention has been illustrated and described as embodied in a break-spinning apparatus, it is not intended to be limited to the details shown, since various modifications and structural changes may be made without departing in any way from the spirit of the persent invention.

We claim:

1. Break-spinning apparatus comprising, in combination: a rotary spinning chamber having an axis of rotation, said spinning chamber having an internal cavity provided with an open side and bounded at least in part by an inner circumferential slip surface concentric with said axis of rotation; fiber supply means for suppying fibers for deposition onto said slip surface, and for subsequent conversion into a yarn; wall means including a wall portion extending through said open side into said cavity and having an outer surface juxtaposed with said inner circumferential surface; and channel means provided in said wall means communicating with said supply means, said channel means having an outlet provided in said outer surface and penetrating the same eccentrically with reference to said axis of rotation and on a penetration curve a projection of which, taken in the direction towards said slip surface along the surface lines of said channel means defines on said slip surface a fiber impingement area whose limits in direction of said axis of rotation correspond substantially to predetermined contour lines of said slip surface.

2. An apparatus as defined in claim 1, said fiber supply means comprising a carding roller, said open side of said spinning chamber being bounded by an edge face located in a first plane transverse to said axis of rotation, and said channel means comprising a straight channel having a major and a minor cross-sectional axis as well as a longitudinal axis forming with said first plane an acute angle; and wherein an intersection of said first plane with a second plane passing through both said longitudinal axis and said major cross-sectional axis, defines with said longitudinal axis an angle of between substantially 20° and 89°.

3. An apparatus as defined in claim 1, said fiber supply means comprising a carding roller, said open side of said spinning chamber being bounded by an edge face located in a first plane transverse to said axis of rotation, and said channel means comprising an arcuately curved channel having a major and a minor cross-sectional axis as well as a longitudinal axis curved to resemble a portion of a circle and intersecting said first plane at an acute angle; and wherein an intersection of said first plane with a second plane passing through both said major axis and said longitudinal axis defines with said longitudinal axis an acute angle.

4. An apparatus as defined in claim 3, wherein said carding roller has an axis of rotation, and wherein the axis of rotation of said carding roller and the axis of rotation of said spinning chamber extend at right angles to one another and pass each other in space.

5. An apparatus as defined in claim 1, said open side of said spinning chamber being bounded by an edge face located in a first plane normal to said axis of rotation, and said channel means comprising a channel having a major and a minor cross-sectional axis as well as a longitudinal axis which defines with said first plane an acute angle; and wherein a tangent line to said longitudinal axis at said outlet intersects said slip surface substantially in a locus corresponding to the main apex of an imaginary curve formed by the intersection of a second plane passing through both said major and said longitudinal axis with a section of said slip surfaces.

6. An apparatus as defined in claim 1, said open side of said spinning chamber being bounded by an edge face located in a plane transverse to said axis of rotation; and wherein said channel means comprises a channel having two transversely spaced walls which are helical with reference to the longitudinal axis of said channel which longitudinal axis extends intermediate said helical walls, said longitudinal axis defining with said plane an acute angle.

7. An apparatus as defined in claim 6, wherein said channel is straight.

8. An apparatus as defined in claim 6, said supply means comprising a carding roller having an axis of rotation, and wherein said axes of rotation of said spinning chamber and said carding roller are located in a common plane but normal to one another.

9. An apparatus as defined in claim 1, wherein said outer surface is of cylindrical configuration.

10. An apparatus as defined in claim 1, said channel means having an inlet which communicates with the ambient atmosphere.

11. An apparatus as defined in claim 1, wherein said outer surface tapers conically in longitudinal direction of said axis of rotation of said spinning chamber.

12. An apparatus as defined in claim 1, said channel means having an inlet; and wherein said supply means comprises a high-draft device for fibrous sliver, said high-draft device including a pair of delivery rollers arranged immediately adjacent said inlet for delivering drafted sliver thereinto.

13. An apparatus as defined in claim 1, wherein said channel means diverges in direction towards said outlet.

14. An apparatus as defined in claim 1, wherein said channel means first converges and thereupon diverges in direction towards said outlet.

15. An apparatus as defined in claim 1, wherein said channel diverges asymmetrically towards said outlet and in the direction of rotation of said rotary spinning chamber.

16. An apparatus as defined in claim 1, said channel means comprising a channel section upstream proximal to said outlet, said channel section diverging roundedly and asymmetrically towards said outlet and in the direction of rotation of said rotary spinning chamber.

17. An apparatus as defined in claim 1; and further comprising an outlet means provided in said rotary spinning chamber.

18. An apparatus as defined in claim 1; and further comprising motion-transmitting means associated with said rotary spinning chamber for imparting rotation thereto.

References Cited

UNITED STATES PATENTS

| | | | |
|---|---|---|---|
| 3,339,359 | 9/1967 | Rypka et al. | 57—58.89 |
| 3,368,340 | 2/1968 | Barsukov et al. | 57—58.89 |
| 3,439,488 | 4/1969 | Bucil et al. | 57—58.95 |
| 3,447,298 | 6/1969 | Collins | 57—58.89 |

JOHN PETRAKES, Primary Examiner